US011942269B1

(12) United States Patent
Tobias et al.

(10) Patent No.: US 11,942,269 B1
(45) Date of Patent: Mar. 26, 2024

(54) SECURITY ASSEMBLY FOR A SECURITY SYSTEM

(71) Applicants: Marc Tobias, Pittsburgh, PA (US); Tobias Bluzmanis, Miramar, FL (US)

(72) Inventors: Marc Tobias, Pittsburgh, PA (US); Tobias Bluzmanis, Miramar, FL (US)

( * ) Notice: Subject to any disclaimer, the term of this patent is extended or adjusted under 35 U.S.C. 154(b) by 0 days.

(21) Appl. No.: 18/368,314

(22) Filed: Sep. 14, 2023

Related U.S. Application Data

(63) Continuation-in-part of application No. 17/958,736, filed on Oct. 3, 2022.

(60) Provisional application No. 63/309,032, filed on Feb. 11, 2022.

(51) Int. Cl.
*H01F 7/02* (2006.01)
*E05B 45/06* (2006.01)
*G08B 13/08* (2006.01)

(52) U.S. Cl.
CPC ........... *H01F 7/0205* (2013.01); *E05B 45/06* (2013.01); *G08B 13/08* (2013.01); *E05B 2045/0665* (2013.01)

(58) Field of Classification Search
None
See application file for complete search history.

(56) References Cited

U.S. PATENT DOCUMENTS 3,813,663 A 5/1974 Perkins
4,339,747 A 7/1982 Maybee
5,668,533 A 9/1997 Jackson, Jr.
5,680,095 A 10/1997 Nassouri
7,116,224 B2 * 10/2006 Mickler .................. F41C 33/06 340/568.1
7,501,595 B2 3/2009 Dimig
7,710,266 B2 * 5/2010 Belden, Jr. .............. A47F 7/024 340/568.8
7,740,214 B2 * 6/2010 Marsilio ............. F16M 11/041 340/568.8
8,106,772 B2 * 1/2012 Irmscher .............. G08B 13/149 340/568.1
8,212,672 B2 * 7/2012 Brenner .................. G09F 27/00 340/568.1
8,525,688 B2 * 9/2013 Chatterjee .......... G08B 13/1409 340/686.1
9,871,399 B2 1/2018 Mittleman
10,227,796 B2 * 3/2019 Moock ................... F16M 13/00
10,304,299 B1 * 5/2019 Acosta ............... G08B 13/1895
11,156,020 B2 10/2021 Lin
2003/0015408 A1 1/2003 Woods
2005/0134458 A1 * 6/2005 Leyden ............. G08B 13/1445 340/568.2

(Continued)

*Primary Examiner* — Muhammad Adnan
(74) *Attorney, Agent, or Firm* — Jeffrey A. Proehl; Woods, Fuller, Shultz & Smtih, PC

(57) ABSTRACT

A security assembly may have at least two components including a first component and a second component. The first and second components may be engageable together, and may have an engaged condition and a disengaged condition. The engaged condition may be characterized by the first and second components being abutted against each other, and the disengaged condition may be characterized by the first and second components being spaced from each other. The security assembly may be configured to utilize a physical manipulation aspect and a magnetic interaction aspect between the first and second components.

17 Claims, 10 Drawing Sheets

(56) References Cited

U.S. PATENT DOCUMENTS

2007/0080806 A1* 4/2007 Lax .................... G08B 13/2448 340/572.1
2007/0229259 A1* 10/2007 Irmscher ............ G06Q 30/0601 340/568.2
2008/0238609 A1* 10/2008 Wiesner .................... B25F 5/00 173/217
2009/0079566 A1* 3/2009 Goldstein .......... G08B 13/1463 340/568.1
2010/0270320 A1* 10/2010 Arrighi .............. G08B 13/2445 340/572.1
2011/0227735 A1* 9/2011 Fawcett ................. G08B 13/14 340/568.8
2012/0099256 A1* 4/2012 Fawcett ............. G08B 13/1445 361/679.01
2012/0218109 A1* 8/2012 Tatsumi ............. G08B 13/1454 340/568.8
2012/0293330 A1* 11/2012 Grant ................. G08B 21/0266 340/568.8
2013/0169434 A1* 7/2013 McCown ............... H04M 11/04 340/5.2
2013/0241731 A1* 9/2013 Fawcett ............. G08B 13/1445 340/568.2
2013/0257616 A1* 10/2013 Taylor ................ G08B 21/0225 340/568.1
2014/0062698 A1* 3/2014 Fawcett ............. G08B 13/1418 340/568.3
2014/0159899 A1* 6/2014 Crook .................... G08B 25/10 340/568.1
2014/0340225 A1* 11/2014 Grant ................. G08B 13/1445 340/568.2
2015/0089675 A1* 3/2015 Gulick, Jr. ............ G06F 1/1632 726/35
2015/0091729 A1* 4/2015 Phillips ................ G08B 13/149 340/568.2
2016/0307416 A1* 10/2016 Marszalek ............. G08B 25/10
2018/0047263 A1* 2/2018 Burtness .............. G08B 13/149
2018/0182216 A1* 6/2018 Grant ................... G08B 13/149
2018/0322748 A1* 11/2018 Henson .................. G08B 25/10
2020/0373701 A1* 11/2020 Kien ...................... H01R 43/26
2021/0264754 A1* 8/2021 Baker ................. E05B 73/0017
2022/0262181 A1* 8/2022 Helman ................. G08B 13/14

* cited by examiner

SECURITY ASSEMBLY FOR A SECURITY SYSTEM

REFERENCE TO RELATED APPLICATIONS

This application is a continuation-in-part of U.S. Non-Provisional patent application Ser. No. 17/958,736, filed Oct. 3, 2022, which claims the priority benefit of U.S. Provisional Patent Application No. 63/309,032, filed Feb. 11, 2022, and each of which is hereby incorporated by reference in its entirety.

BACKGROUND

Field

The present disclosure relates to security systems and more particularly pertains to a new security assembly for a security system for providing an adaptable security interface between an object to be secured and a security apparatus.

SUMMARY

In some aspects, the present disclosure relates to a security assembly which may comprise at least two components, and the at least two components may include a first component for associating with an object to be secured and a second component for associating with an alarm interface. The first and second components may be engageable together, and the first and second components may have an engaged condition and a disengaged condition. The engaged condition may be characterized by the first and second components being abutted against each other. The disengaged condition may be characterized by the first and second components being spaced from each other. The security assembly may be configured to utilize a physical manipulation aspect and a magnetic interaction aspect between the first and second components.

In other aspects, the disclosure relates to a security assembly which may comprise at least two components, and the at least two components may include a first component for associating with an object to be secured and a second component for associating with an alarm interface. The first and second components may be engageable together, and the first and second components may have an engaged condition and a disengaged condition. The engaged condition may be characterized by the first and second components being abutted against each other. The disengaged condition may be characterized by the first and second components being spaced from each other. The security assembly may be configured to utilize a physical manipulation aspect and a magnetic interaction aspect between the first and second components. The magnetic interaction aspect of the security assembly may be configured to hold the first and second components together by a magnetic attraction force in the engaged condition in a manner that permits separation of the components into the disengaged condition. The first and second components may be separable from the engaged condition to the disengaged condition by application of physical force to the components that overcomes the magnetic attraction force between the first and second components. The magnetic interaction aspect of the security assembly may comprise at least one of the first and second components incorporating a magnetically-active element and another one of the first and second components incorporating a magnetically-receptive element such that the first and second components are magnetically attracted toward each other. The physical manipulation aspect of the security assembly may comprise a protrusion extending from the first component of the security assembly and a recess on the second component and configured on the second component to receive at least a portion of the protrusion of the first component when the first and second components are in the engaged condition.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
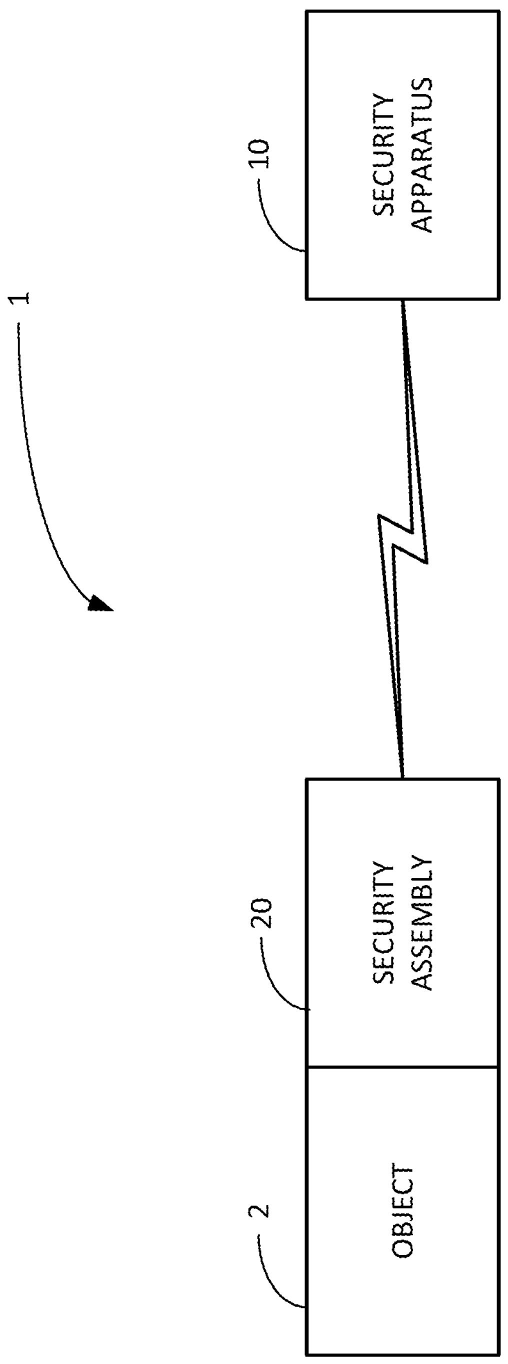
FIG. 1 is a schematic diagram of a new security system according to the present disclosure.
Figure 2:
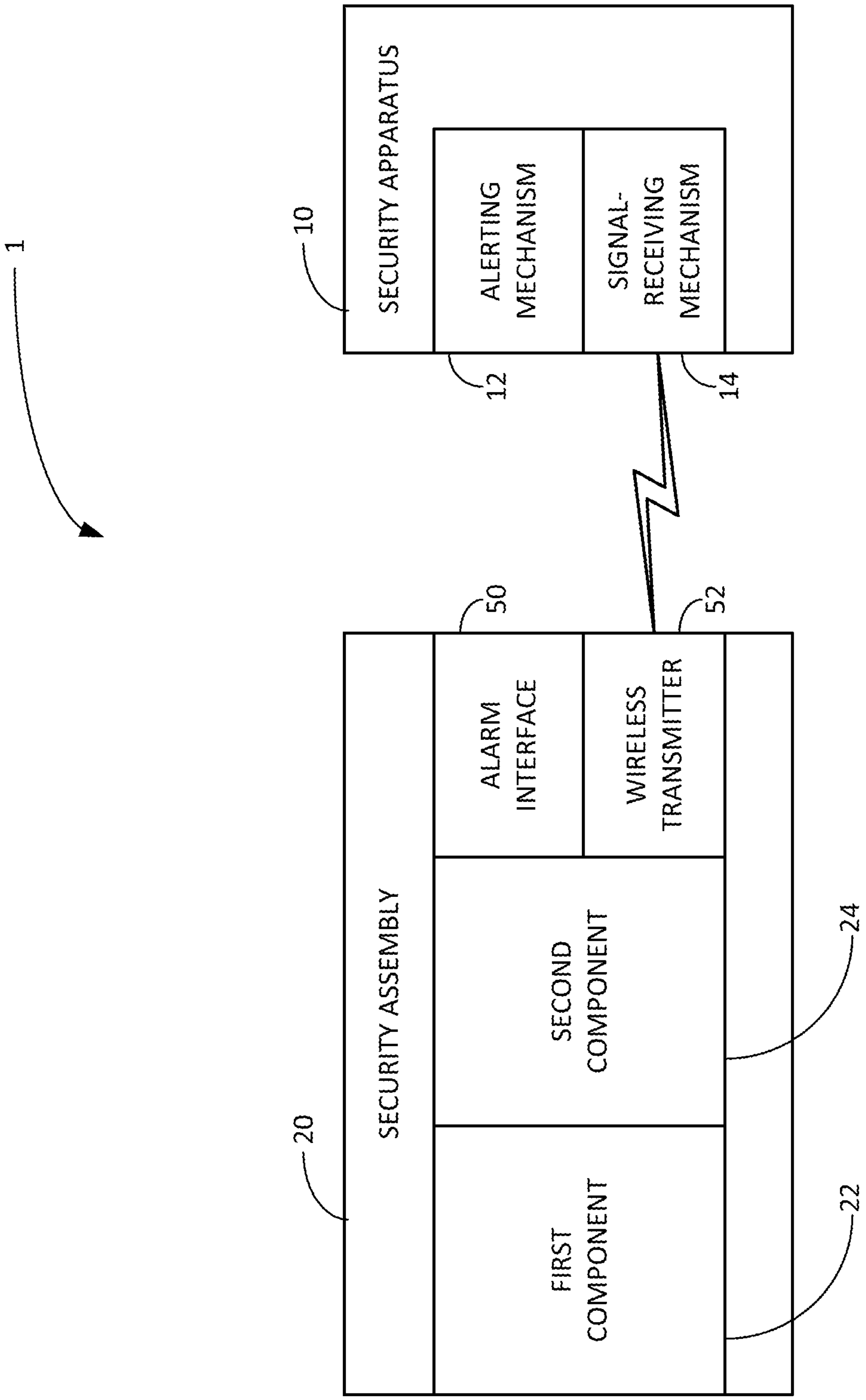
FIG. 2 is a schematic diagram of aspects of the security apparatus and security assembly of the system, according to an illustrative embodiment.
Figure 3:
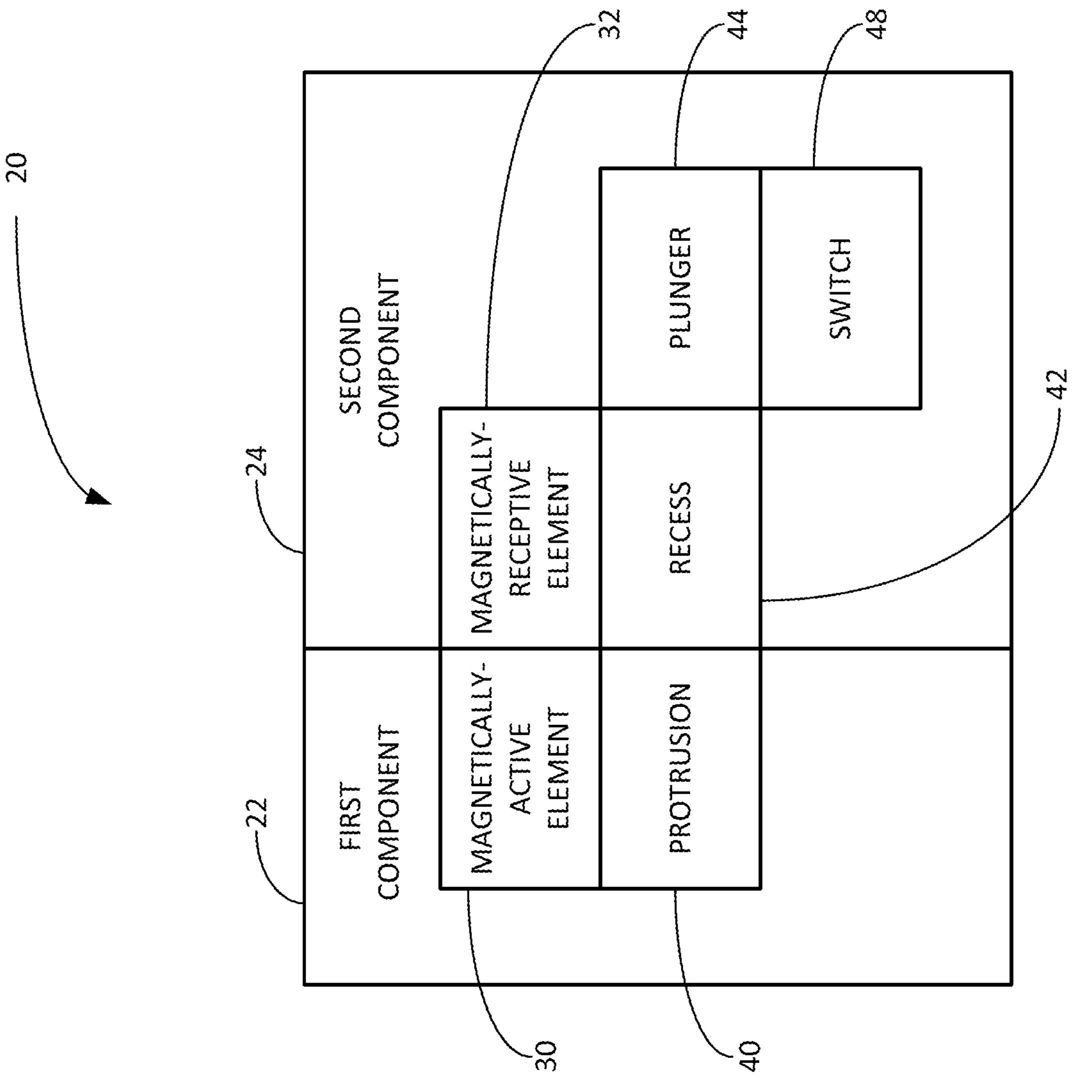
FIG. 3 is a schematic diagram of elements of the security assembly of the system, according to an illustrative embodiment.
Figure 4:
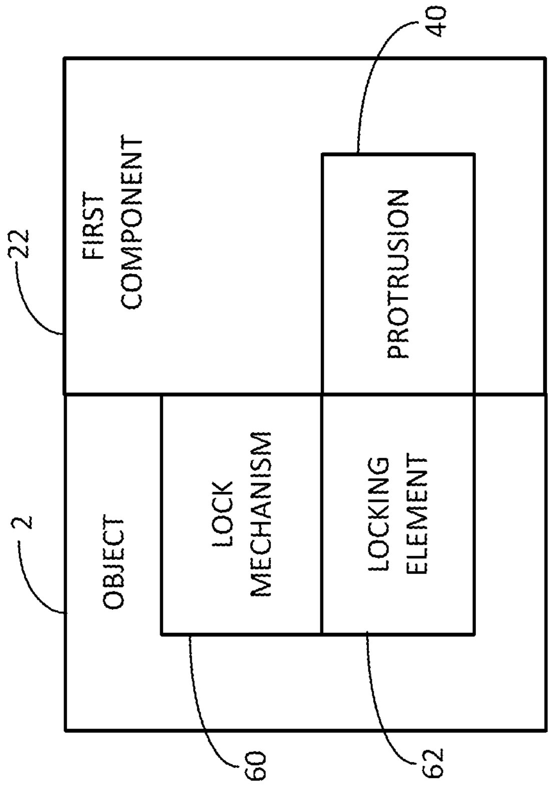
FIG. 4 is a schematic diagram illustrative of interrelationships between elements of the object and the first component of the security assembly, according to an illustrative embodiment.
Figure 5:
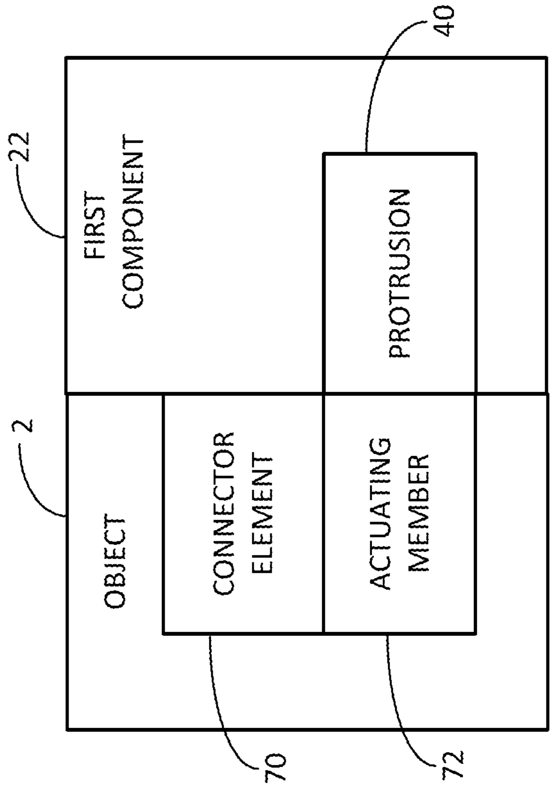
FIG. 5 is a schematic diagram illustrative of interrelationships between elements of the object and the first component of the security assembly, according to an illustrative embodiment.
Figure 6:
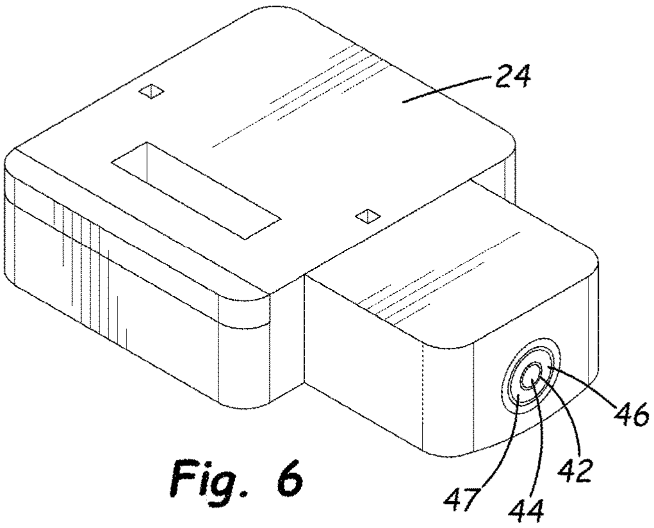
FIG. 6 is a schematic perspective view of a component with elements of the physical manipulation aspects of the security system, according to an illustrative embodiment.
Figure 7:
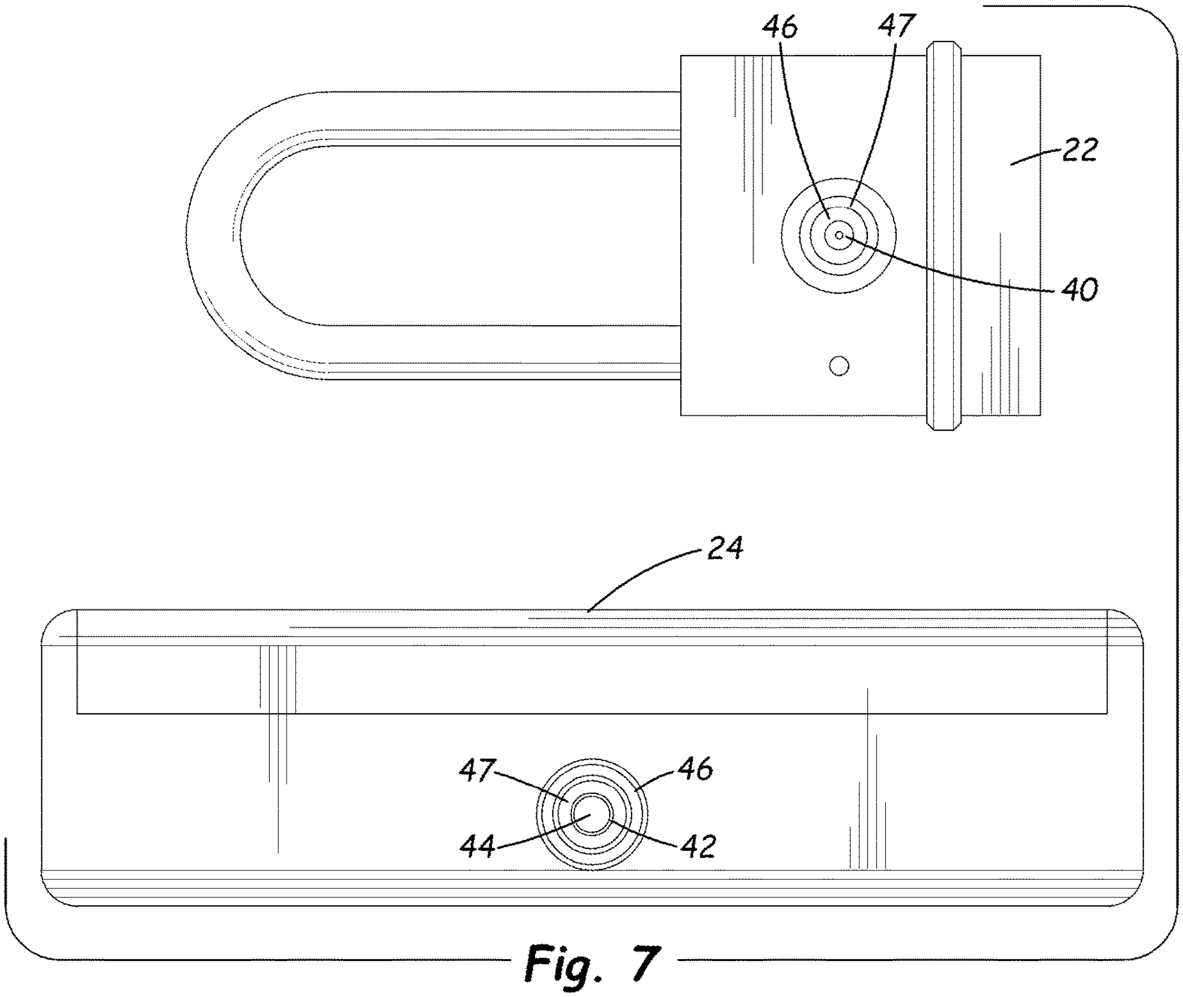
FIG. 7 is a schematic side view of examples of first and second components having elements of the physical manipulation aspects of the security system, according to an illustrative embodiment.

With reference now to the drawings, and in particular to FIGS. 1 through 12 thereof, a new security assembly for a security system embodying the principles and concepts of the disclosed subject matter will be described.

In a broad sense, the disclosure relates to a system 1 may be employed to provide some aspect of security for an object 2. In some implementations, aspects of the system 1 may include, or be used in conjunction with, a security apparatus 10 configured for providing a security platform for alarm elements to facilitate implementation of security alerting features for a space, such as a space in or adjacent to a building structure. Illustratively, the security apparatus 10 may be associated with the building structure, such as being positioned in the building structure. In some illustrative embodiments, the security apparatus 10 may include an alerting mechanism 12 configured to produce an alert perceptible by a person so that the person is able to understand that some condition relating to the security of the object has occurred. The perceptible alert may comprise an audible alert, a visible alert, and/or a tactile alert, or an alert that is transmitted to a device associated with a person, for example, a cellular telephone with processing capabilities, such as a "smartphone." The security apparatus 10 may also include a signal receiving mechanism 14 configured to wirelessly receive an alerting signal which may be processed by the apparatus 10, and receipt of the alerting signal may result in the triggering or activation of the alerting mechanism 12 of the apparatus 10. The security apparatus 10 may have additional features, such as those typical of a building security system, Embodiments of the system 1 may include a security assembly 20 for providing an aspect of security for the object 2. The security assembly 20 may comprise at least two components, which may include a first component 22 and a second component 24. In some embodiments, the first component 22 may be associated with the object 2 to be secured, and the second component 24 may have an alarm interface which is wirelessly interfaced to an external system, such as the signal receiving mechanism 14 of the security apparatus 10. In some implementations, the second component 24 may be secured to an immovable object or structure for the purpose of securing the object 2 to the immovable object. Illustratively, the object 2 may include devices having various purposes, such as communication devices and computing devices, and/or security devices for providing security to another device, such as a padlock or a gun trigger lock.

The first 22 and second 24 components may be engageable together or with each other, and the components 22, 24 may have an engaged condition and a disengaged condition. The engaged condition of the components 22, 24 may be characterized by the first and second components being abutted against each other, or otherwise being in contact with each other. The disengaged condition may be characterized by the first and second components being separated or spaced from each other, and may also be characterized by there being no contact between the components. The first 22 and second 24 components may thus be separated from each other when changing from the engaged condition to the disengaged condition.

In embodiments, the security assembly 20 may be configured to utilize a physical manipulation aspect and a magnetic interaction aspect between the components 22, 24. The magnetic interaction aspect of the components may be configured to hold the first 22 and second 24 components together by a magnetic attraction force which helps produce the engaged condition of the components and that permits separation of the components in the engaged condition into the disengaged condition. The securement of the components 22, 24 may thus be accomplished by magnetic attraction between the components, and the magnetic securement may occur without the magnetic interaction providing any communication between the components. The first 22 and second 24 components may be separable from the engaged condition to the disengaged condition by application of physical force to the components that overcomes the magnetic attraction force between the first and second components. The application of physical force to overcome the magnetic attraction may be characterized by the force having a magnitude appliable to the components by the hands of a human. The engaged condition may further be characterized by there being no physical or mechanical interconnection between the components that needs to be overcome or manipulated to move the components from the engaged to the disengaged condition.

In greater detail, the magnetic interaction aspect of the components 22, 24 of the security assembly may be implemented by at least one of the first and second components incorporating a magnetically-active element 30 and the other (or another) one of the first and second components incorporating a magnetically-receptive element 32 so that the components 22, 24 are magnetically attracted toward each other. Optionally, each (or both) of the first and second components may incorporate magnetically-attractive elements.

The physical manipulation aspect of the components of the security assembly may include a protrusion 40 on the first component 22 of the security assembly 20. In some embodiments, the protrusion 40 may extend from the first component 22, and may be fixed in position with respect to other parts of the first component. In some embodiments, the protrusion 40 may be extendable with respect to other parts of the first component 22, and the protrusion may be movable with respect to the other parts of the first component to an extended position from a retracted position, and may be movable from the extended to retracted positions.

The physical manipulation aspect of the security assembly may also include a recess 42 on the second component 24 of the security assembly, and the recess 42 may be configured to receive at least a portion of the protrusion 40 of the first component 22 when the first and second components are in the engaged condition. In some embodiments, the recess 42 of the second component includes a plunger 44 movable. or capable of being moved, by the protrusion 40 of the first component 22 when the first and second components are in the engaged condition. In some implementations, the plunger 44 may be depressed by the protrusion 40 when the first and second components are brought into the engaged condition. In some implementations, the plunger 44 may be depressed by movement of the protrusion 40 from the retracted position to the extended position when the first and second components are in the engaged condition (see, e.g., FIGS. 12A and 12B).

In some embodiments, the plunger 44 may be connected to an electrical switch 48 in a manner such that movement of the plunger actuates or operates the switch. The switch 48 may be actuatable between an actuated condition and an unactuated condition. Illustratively, the actuated condition of the switch 48 may be a "closed" (or continuity) condition of the switch, and the unactuated condition may be an "open" (or non-continuity) condition of the switch.

Figure 12A:
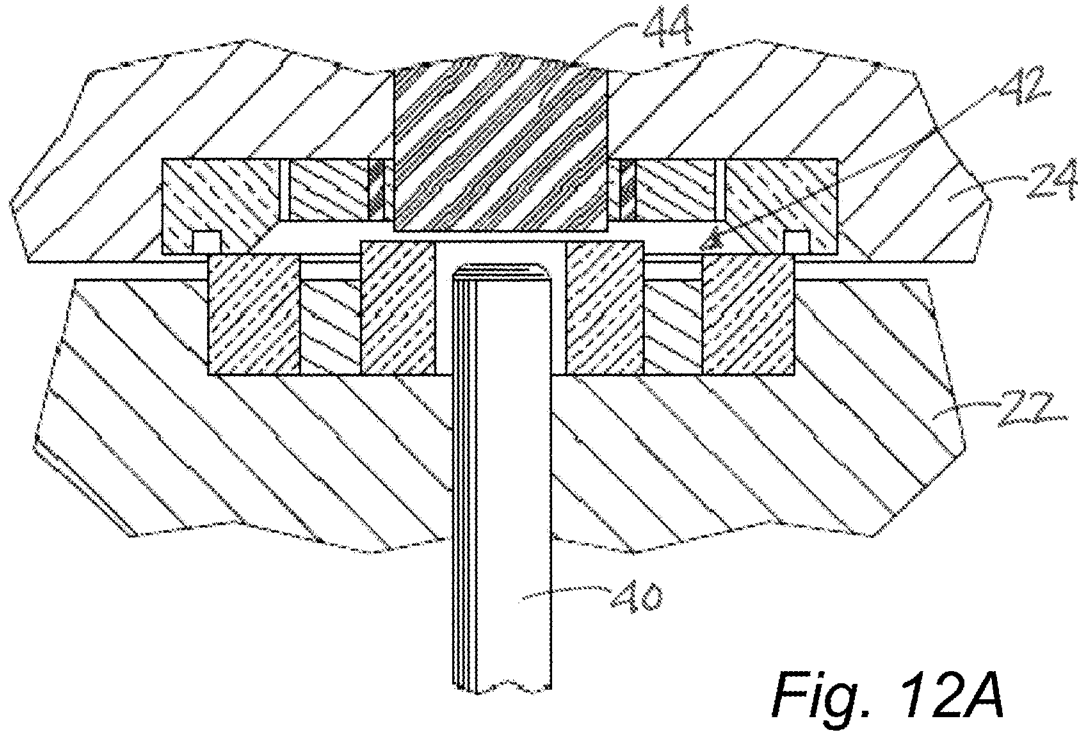
FIG. 12A is a schematic side sectional view of portions of first and second components in an engaged condition with the protrusion of the first component in the retracted position and not in contact with the plunger of the second component in a non-depressed condition, according to an illustrative embodiment.
Figure 12B:
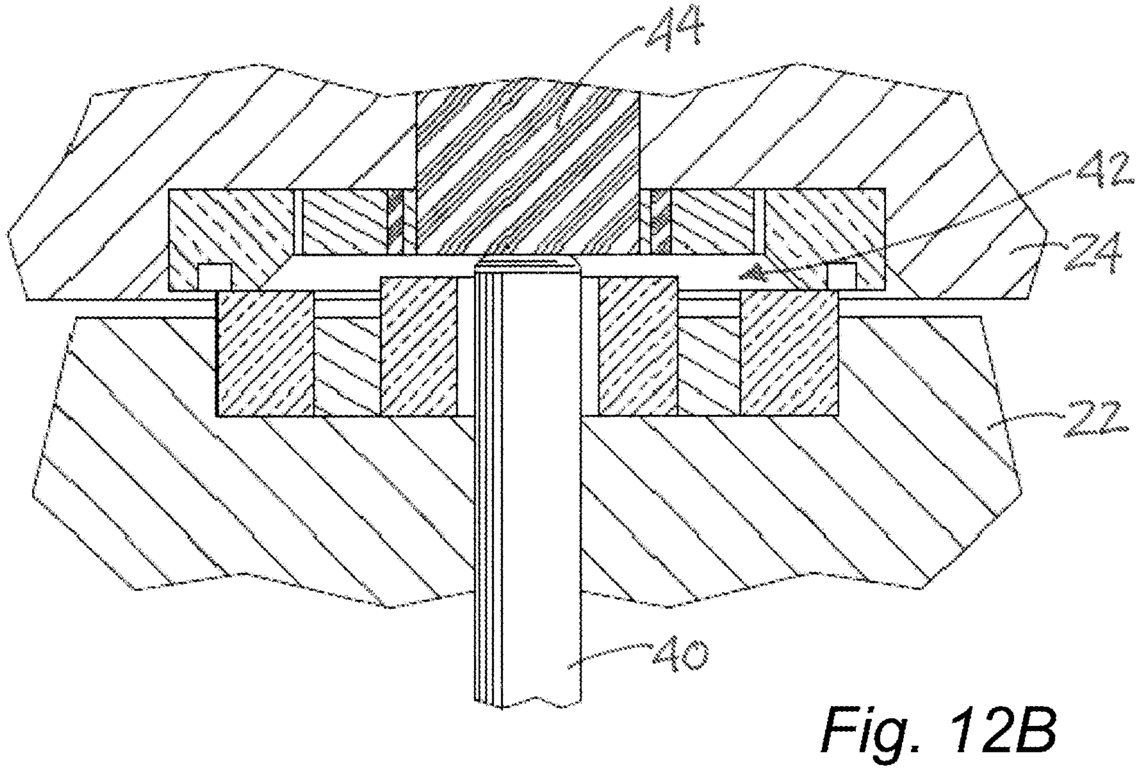
FIG. 12B is a schematic side sectional view of portions of first and second components in an engaged condition with the protrusion of the first component in the extended position and contacting the plunger of the second component which is in a depressed condition, according to an illustrative embodiment.

Illustratively, FIG. 12A shows the protrusion 40 of the first component 22 in the retracted position, while FIG. 12B shows a protrusion 40 of the first component in the extended position. Correspondingly, FIG. 12A illustrates the retracted protrusion 40 being withdrawn from contact with the plunger 44 such that the plunger and the switch 48 are in the unactuated condition, and FIG. 12B illustrates the extended protrusion 40 in contact with the plunger 44 such that the plunger is depressed and the plunger and the switch 48 are in the actuated condition.

Optionally, additional features may facilitate positioning of the first 22 and second 24 components with respect to each other when the components are in the engaged condition to assist in the bringing together of the components to establish the engaged condition and also assist in the maintenance of the proper positioning of the components in the engaged condition. In embodiments, such as those depicted in FIGS. 6 and 7, physical features on the surface of the components 22, 24 may produce a degree of interlock between the exteriors of the components to help maintain the components in the engaged condition. For example, one or more concentric ridges 46 may be formed on one of the components that are substantially complementary in configuration to one or more concentric grooves 47 formed on the other of the components, and optionally each component may include one or more ridges 46 and one or more grooves 47 positioned with respect to each other to intermesh with each other when the components are in the engaged condition.

The security assembly 30 may include an alarm interface 50 associated with one of the components and configured to send an alerting signal to the security apparatus. In embodiments, the alarm interface 50 may be located on the second component 24. The alarm interface 50 may be configured to send the alerting signal wirelessly to the security apparatus 10, and the alarm interface 50 may include a wireless transmitter 52 configured to send the alerting signal to the security apparatus. Illustratively, the closed or continuity condition of the switch 48 may cause the alarm interface 50 to send the alerting signal to the security apparatus.

In some implementations, the alarm interface 50 may be configured to send the alerting signal when the first 22 and 24 second components are moved from the engaged condition to the disengaged condition, unless the alarm interface is disarmed prior to disengagement. This operation may provide an alert or notification that the first and second components, and the items to which the components are respectively connected, are being moved with respect to each other. In some implementations, the alarm interface 50 may be configured to send the alerting signal when the first and second components are moved from the disengaged condition to the engaged condition, which may provide a notification that the components have been linked together.

The alarm interface 50 may be configured to send the alerting signal when the protrusion 40 of the first component 22 moves from the retracted position to the extended position, and in turn the protrusion actuates the switch 48 of the second component 24 between the unactuated and actuated conditions. In some implementations, the alarm interface 50 may be configured to send the alerting signal when the condition or state of the switch 48 is changed. As an example, the alarm interface 50 may be configured to send the alerting signal when the condition of the switch changes from the closed condition to the open condition, and as a further example, the alarm interface 50 may be configured to send the alerting signal when the condition of the switch changes from the open condition to the closed condition. In some implementations, the alarm interface 50 may be configured to send the alerting signal when one type of condition change is detected, but does not send the alerting signal when another type of condition change is detected. As an example, the alarm interface 50 may be configured to send the alerting signal when the condition of the switch changes from the closed condition to the open condition, but not send the alerting signal when the condition of the switch changes from the open condition to the closed condition.

In some applications of the system 1, the object 2 may incorporate a lock mechanism 60 with a locking element 62 which is movable when the lock mechanism changes from a locked condition of the lock mechanism to an unlocked condition of the lock mechanism. Illustratively, the lock mechanism 60 may include a lock cylinder, and the locking element 62 may comprise an extension of the plug of the lock cylinder. The locking element may be movable by the changing of the lock mechanism between the locked and unlocked condition. The locking element 62 may be suitably connected to the protrusion 40 such that movement of the locking element 62 functions to move the protrusion between the retracted and extended positions, with the resulting actuation of the alarm interface described herein. In other applications of the system 1, other elements of an object 2 may be utilized to act on the protrusion 40 to move the protrusion between the retracted and extended conditions. For example, the action on the protrusion 40 may be the result of electromechanical operation, such as a solenoid, that is initiated by actuation of, for example, a biometric scanner associated with the object, or actuation of a keypad associated with the object.

Figure 8:
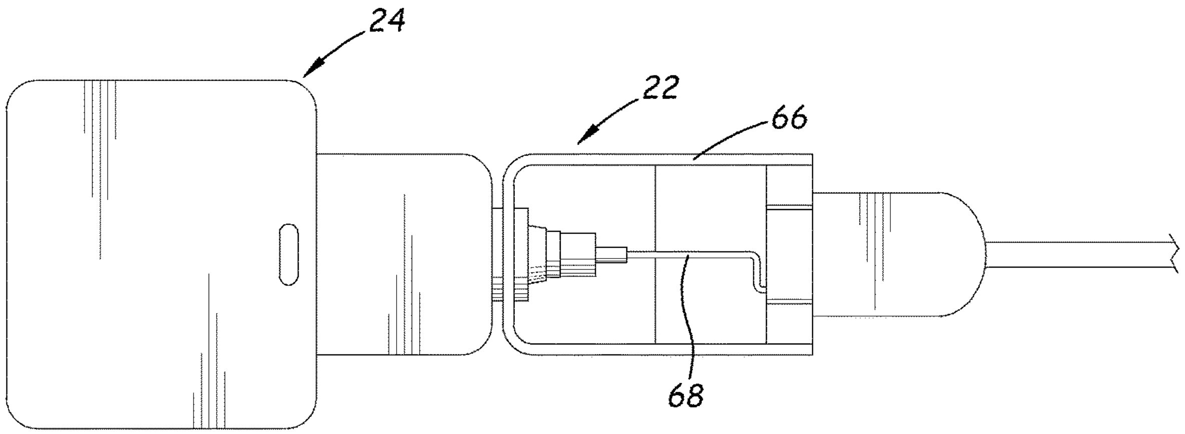
FIG. 8 is a schematic side view of examples of first and second components having elements of the physical manipulation aspects of the security system with a cover portion removed to expose elements of the physical manipulation aspects, according to an illustrative embodiment.
Figure 9:
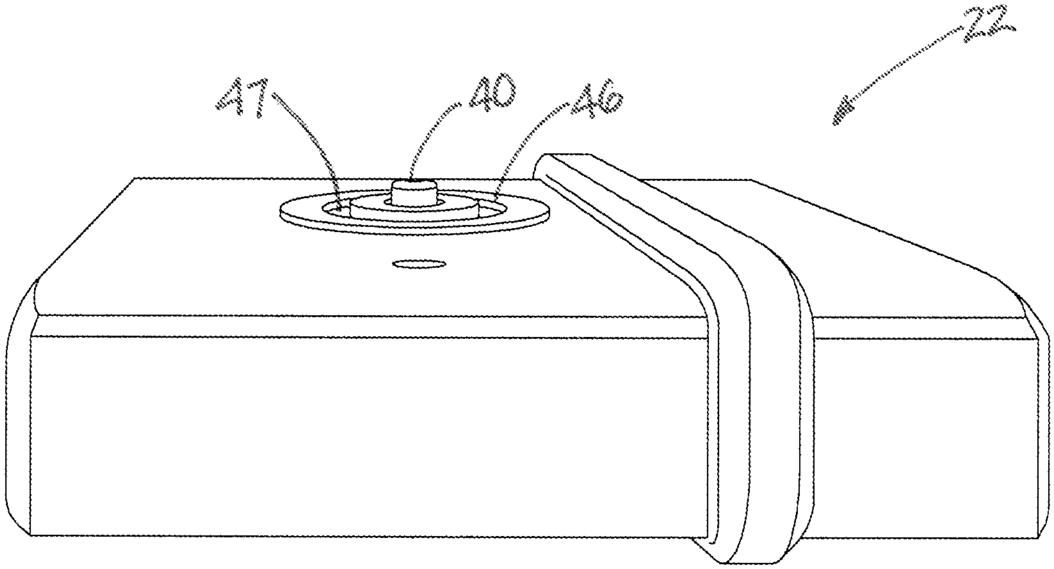
FIG. 9 is a schematic side perspective view of a portion of a first component showing the protrusion associated with the plunger in the extended position, according to an illustrative embodiment.
Figure 10:
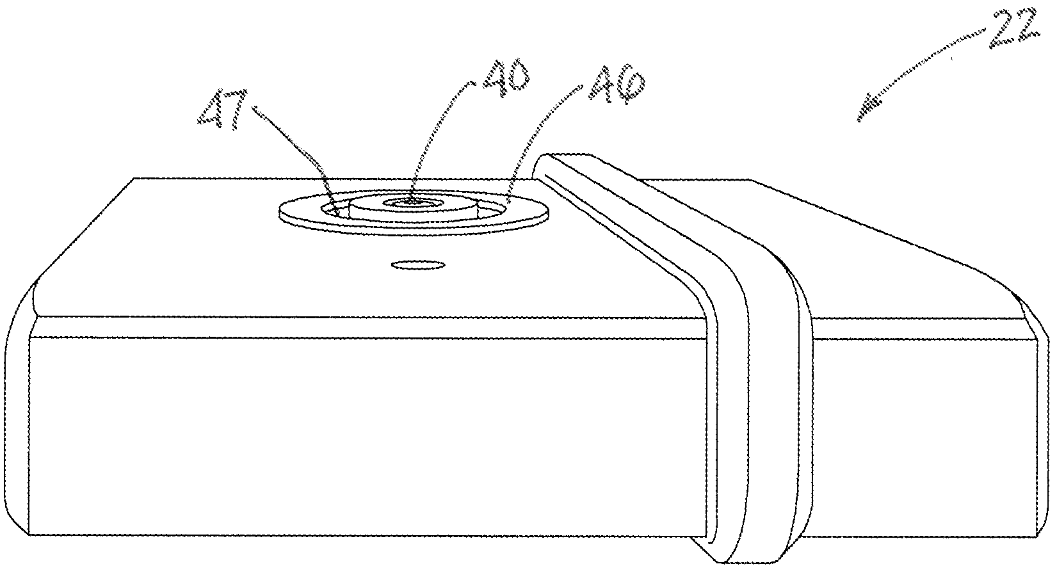
FIG. 10 is a schematic side perspective view of a portion of a first component showing the protrusion associated with the plunger in the retracted position, according to an illustrative embodiment.
Figure 11:
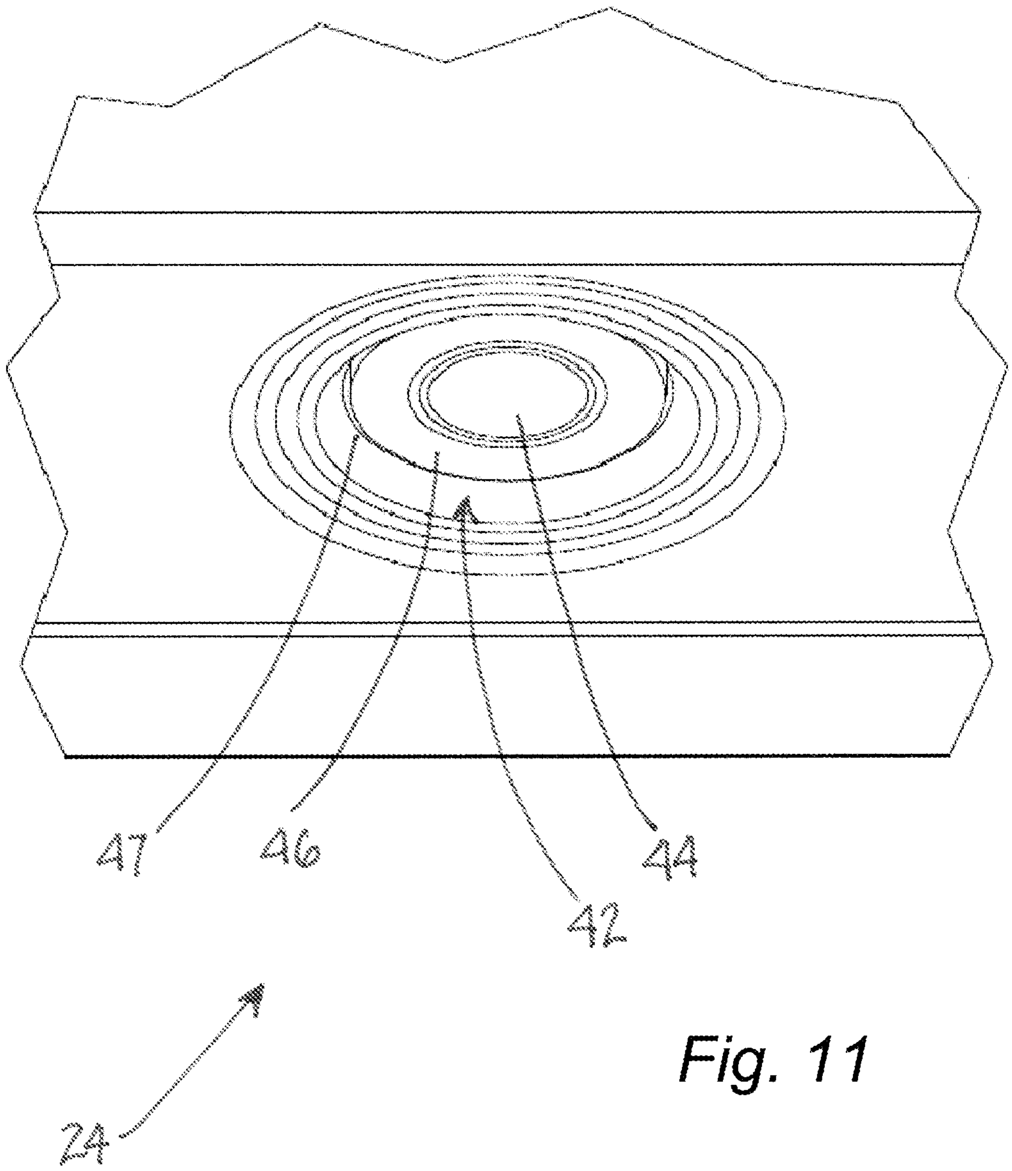
FIG. 11 is a schematic side perspective view of a portion of a second component showing the plunger in a recess of the second component, according to an illustrative embodiment.

In other applications of the system 1, the object 2 may incorporate a connector element 66, and the element 66 may be a part of a data connector structure (see, for example, FIG. 8). For example, the connector element 66 may be a part of a power connector structure, and the element 66 may comprise a connector jack, such as, for example, a universal serial bus (USB) jack. The connector jack may have a connected condition, in which a connector plug is inserted into the connector jack, and a disconnected condition, in which the connector plug is removed from the connector jack. In such an application, the security assembly 20 may additionally comprise an actuating member 68 at least partially positioned in a cavity of the connector jack such that insertion of a connector plug into the connector jack contacts and moves the actuating member 68. The actuating member 68 may be configured to move the protrusion 40 between the retracted and extended conditions when the connector plug is inserted into or removed from the connector plug. Such an implementation may be capable of providing an alert when the condition of the connector element changes, such as, for example, the unplugging of a USB plug from a USB jack.

In some implementations, the security assembly 20 may include additional sensors or actuating mechanisms, such as an auxiliary trip sensor 70 which may be actuated by the presence of a magnetic field within a range of the sensor, such as the range of the magnetic field of the magnetic source. The auxiliary trip sensor 70 may be triggered into a trigger condition by the sensor 70 being in, or moved into, a magnetic field and may be released into an untriggered condition by the sensor 70 being outside of, or being moved out of, the magnetic field. In an exemplary embodiment, the auxiliary trip sensor 70 may be incorporated into the component 22, 24 that does not include the magnetically-active element 30 so that when the components 22, 24 are moved toward each other and toward the engaged condition, the trip sensor 70 is triggered into the triggered condition. Conversely, the movement of the components 22, 24 away from each other and out of the engaged condition, the trip sensor 70 may be released into the untriggered condition. An illustrative example of a highly suitable sensor 70 is available from Magnasphere Corp., N22 W22931 Nancys Ct. Ste 3, Waukesha, WI 53186 USA. Optionally, the auxiliary trip sensor 70 may be connected to the alarm interface 50 such that the trigger condition may cause the alarm interface to send the alerting signal.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A security assembly comprising:

at least two components, the at least two components including a first component for associating with an object to be secured and a second component for associating with an alarm interface, the first and second components being engageable together, the first and second components having an engaged condition and a disengaged condition, the engaged condition being characterized by the first and second components being abutted against each other, the disengaged condition being characterized by the first and second components being spaced from each other:

wherein the security assembly is configured to utilize a physical manipulation aspect and a magnetic interaction aspect between the first and second components;

wherein the magnetic interaction aspect of the security assembly is configured to secure the first and second components together by a magnetic attraction force in the engaged condition in a manner that permits separation of the components into the disengaged condition, the magnetic securement of the first and second components together is accomplished without the magnetic interaction providing any communication between the first and second components; and wherein the physical manipulation aspect of the security assembly includes:

a protrusion on the first component of the security assembly, the protrusion being extendable with respect to other parts of the first component from a retracted position to an extended position and from the extended position to the retracted position; and a plunger on the second component of the security assembly, the plunger being movable with respect to other parts of the second component, the plunger being movable from an un-depressed position to a depressed position by the protrusion of the first component when the first and second components are in the engaged condition and the protrusion is moved from the retracted position to the extended position; and a switch located on the second component and connected to the plunger in a manner such that movement of the plunger from the undepressed position to the depressed position actuates the switch between an actuated condition and an unactuated condition.

2. The assembly of claim 1 wherein the first and second components are separable from the engaged condition to the disengaged condition by application of physical force to the components that overcomes the magnetic attraction force between the first and second components.

3. The assembly of claim 2 wherein the application of physical force to the first and second components to overcome the magnetic securement is characterized by a magnitude of force appliable by the hands of a human.

4. The assembly of claim 1 wherein the magnetic interaction aspect of the security assembly comprises at least one of the first and second components incorporating a magnetically-active element and another one of the first and second components incorporating a magnetically-receptive element such that the first and second components are magnetically attracted toward each other.

5. The assembly of claim 4 wherein each of the first and second components incorporate magnetically-attractive elements.

6. The assembly of claim 1 wherein the physical manipulation aspect of the security assembly comprises a recess on the second component of the security assembly, the recess being configured on the second component to receive at least a portion of the protrusion of the first component when the first and second components are in the engaged condition.

7. The assembly of claim 1 wherein the security assembly comp command rises an alarm interface associated with the second component and configured to wirelessly send an alerting signal to a security apparatus external to the components when the switch changes from one condition of the switch to an other condition of the switch.

8. The assembly of claim 1 wherein the security assembly comprises an alarm interface associated with the second component and configured to wirelessly send an alerting signal to a security apparatus external to the components; and wherein the alarm interface is configured to send the alerting signal when the first and second components are moved from one of the engaged and disengaged conditions to an other one of the engaged and disengaged conditions.

9. The assembly of claim 1 wherein the object incorporates a lock mechanism with a locking element movable when the lock mechanism changes from a locked condition of the lock mechanism to an unlocked condition of the lock mechanism, the locking element being connected to the protrusion such that movement of the locking element moves the protrusion between extended and retracted positions.

10. The assembly of claim 1 wherein the object incorporates a connector element including a connector jack, the connector jack having a connected condition in which a connector plug is inserted into the connector jack, the connector jack having a disconnected condition in which the connector plug is removed from the connector jack; and wherein the security assembly additionally comprises an actuating member at least partially positioned in a cavity of the connector jack such that insertion of a connector plug into the connector jack moves the actuating member, the protrusion being movable by the actuating member when the connector plug is inserted into or removed from the connector plug.

11. The assembly of claim 1 wherein the security assembly comprises an alarm interface associated with the second component and configured to wirelessly send an alerting signal to a security apparatus external to the components; and wherein the security assembly additionally includes an auxiliary trip sensor being actuated by a magnetic field, the auxiliary trip sensor being triggered into a trigger condition by the sensor being in the magnetic field and being released into an untriggered condition by the sensor being outside of the magnetic field, the auxiliary trip sensor being incorporated into one of the first and second components, the auxiliary trip sensor being connected to the alarm interface such that the trigger condition causes the alarm interface to send the alerting signal.

12. The assembly of claim 1 wherein the security assembly comprises an alarm interface associated with the second component and configured to wirelessly send an alerting signal to a security apparatus external to the components; and wherein the security assembly additionally includes an auxiliary trip sensor being actuated by a magnetic field, the auxiliary trip sensor being triggered into a trigger condition by the sensor being in the magnetic field and being released into an untriggered condition by the sensor being outside of the magnetic field, the auxiliary trip sensor being incorporated into one of the first and second components, the auxiliary trip sensor being connected to the alarm interface such that the trigger condition causes the alarm interface to send the alerting signal.

13. A security assembly comprising:

at least two components, the at least two components including a first component for associating with an object to be secured and a second component for associating with an alarm interface, the first and second components being engageable together, the first and second components having an engaged condition and a disengaged condition, the engaged condition being characterized by the first and second components being abutted against each other, the disengaged condition being characterized by the first and second components being spaced from each other;

wherein the security assembly is configured to utilize a physical manipulation aspect and a magnetic interaction aspect between the first and second components;

wherein the magnetic interaction aspect of the security assembly is configured to secure the first and second components together by a magnetic attraction force in the engaged condition in a manner that permits separation of the components into the disengaged condition, the magnetic securement of the first and second components together is accomplished without the magnetic interaction providing any communication between the first and second components; and wherein the physical manipulation aspect of the security assembly includes:

a protrusion on the first component of the security assembly, the protrusion extending from and being fixed in position with respect to other parts of the first component; and a plunger on the second component of the security assembly, the plunger being movable with respect to other parts of the second component, the plunger being movable from an un-depressed position to a depressed position by the protrusion of the first component, a recess on the second component of the security assembly being configured to receive at least a portion of the protrusion of the first component when the first and second components are in the engaged condition, the recess including the plunger, the plunger being movable by the protrusion of the first component when the first and second components are moved into the engaged condition; and a switch located on the second component and connected to the plunger in a manner such that movement of the plunger from the undepressed position to the depressed position actuates the switch between an actuated condition and an unactuated condition.

14. The assembly of claim 13 wherein the security assembly comp command rises an alarm interface associated with the second component and configured to wirelessly send an alerting signal to a security apparatus external to the components when the switch changes from one condition of the switch to an other condition of the switch.

15. The assembly of claim 13 wherein the security assembly comprises an alarm interface associated with the second component and configured to wirelessly send an alerting signal to a security apparatus external to the components; and wherein the alarm interface is configured to send the alerting signal when the first and second components are moved from one of the engaged and disengaged conditions to an other one of the engaged and disengaged conditions.

16. The assembly of claim 13 wherein the object incorporates a lock mechanism with a locking element movable when the lock mechanism changes from a locked condition of the lock mechanism to an unlocked condition of the lock mechanism, the locking element being connected to the protrusion such that movement of the locking element moves the protrusion between extended and retracted positions.

17. The assembly of claim 13 wherein the object incorporates a connector element including a connector jack, the connector jack having a connected condition in which a connector plug is inserted into the connector jack, the connector jack having a disconnected condition in which the connector plug is removed from the connector jack; and wherein the security assembly additionally comprises an actuating member at least partially positioned in a cavity of the connector jack such that insertion of a connector plug into the connector jack moves the actuating member, the protrusion being movable by the actuating member when the connector plug is inserted into or removed from the connector plug.

* * * * *